US009068500B2

(12) United States Patent
Weber et al.

(10) Patent No.: US 9,068,500 B2
(45) Date of Patent: Jun. 30, 2015

(54) BOOSTED IN-LINE VARIABLE-DISPLACEMENT ENGINE

(71) Applicant: Ford Global Technologies, LLC, Dearborn, MI (US)

(72) Inventors: Carsten Weber, Leverkusen (DE); Martin Wirth, Remscheid (DE); Rainer Friedfeldt, Huerth (DE); Guenter Bartsch, Gummersbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 75 days.

(21) Appl. No.: 13/952,037

(22) Filed: Jul. 26, 2013

(65) Prior Publication Data

US 2014/0041382 A1 Feb. 13, 2014

(30) Foreign Application Priority Data

Aug. 7, 2012 (DE) .......................... 10 2012 213 936

(51) Int. Cl.
| | |
|---|---|
| *F02D 23/00* | (2006.01) |
| *F02B 37/00* | (2006.01) |
| *F02D 13/06* | (2006.01) |
| *F02D 41/00* | (2006.01) |
| *F02M 25/07* | (2006.01) |
| *F01L 13/00* | (2006.01) |

(52) U.S. Cl.
CPC .......... *F02B 37/002* (2013.01); *F02M 25/0711* (2013.01); *F02M 25/0727* (2013.01); *F02D 13/06* (2013.01); *F02D 41/0007* (2013.01); *F02D 2041/0012* (2013.01); *F01L 2013/001* (2013.01); *F01L 2800/08* (2013.01); *Y02T 10/18* (2013.01); *Y02T 10/144* (2013.01)

(58) Field of Classification Search
CPC ... F02B 37/002; F02D 41/0007; F02D 13/06; F02D 2041/0012; Y02T 10/18; Y02T 10/144; F01L 2013/001; F01L 2800/08; F02M 25/0711; F02M 25/0727

See application file for complete search history.

(56) References Cited

U.S. PATENT DOCUMENTS

| | | | | |
|---|---|---|---|---|
| 4,428,337 A | * | 1/1984 | Parsons ...................... | 123/198 F |
| 4,462,351 A | * | 7/1984 | Fujii et al. .................. | 123/198 F |
| 6,023,929 A | * | 2/2000 | Ma ................................ | 60/295 |

(Continued)

FOREIGN PATENT DOCUMENTS

| | | |
|---|---|---|
| DE | 102004035323 A1 | 2/2006 |
| DE | 102005054249 A1 | 5/2007 |
| WO | 2013068487 A1 | 5/2013 |

OTHER PUBLICATIONS

JP2001329873 Translation, Ariga Kenji, Nov. 30, 2001.*

(Continued)

*Primary Examiner* — Jesse Bogue
(74) *Attorney, Agent, or Firm* — Julia Voutyras; Alleman Hall McCoy Russell & Tuttle LLP (57) ABSTRACT

An engine includes a first turbine fluidically coupled to a first group of adjacent cylinders, and a second turbine fluidically coupled to a second group of adjacent cylinders. In this engine, the cylinders of the first and second groups are arranged along a line. The engine also includes a variable valve-lift system configured to admit at least air to the first group of cylinders during reduced engine-load conditions, but to stop admitting air to the second group of cylinders during the reduced engine-load conditions.

17 Claims, 5 Drawing Sheets

(56) References Cited

U.S. PATENT DOCUMENTS

| | | | |
|---|---|---|---|
| 8,056,337 B2* | 11/2011 | Hokuto et al. | 60/602 |
| 2004/0098970 A1* | 5/2004 | Foster | 60/284 |
| 2007/0056276 A1* | 3/2007 | Petutsching et al. | 60/321 |
| 2007/0068469 A1* | 3/2007 | Matsuda | 123/59.1 |
| 2007/0234985 A1* | 10/2007 | Kolmanovsky | 123/90.15 |
| 2007/0277776 A1* | 12/2007 | Thomas | 123/299 |
| 2009/0204312 A1* | 8/2009 | Moriya | 701/103 |
| 2009/0282807 A1* | 11/2009 | Rioli et al. | 60/276 |
| 2009/0319160 A1* | 12/2009 | Callahan et al. | 701/111 |
| 2011/0023482 A1* | 2/2011 | Styles et al. | 60/605.2 |
| 2011/0144883 A1* | 6/2011 | Rollinger et al. | 701/102 |
| 2013/0199466 A1 | 8/2013 | Friedfeldt et al. | |

OTHER PUBLICATIONS

JPH05156960 Translation: Kawamura Hideo; Jun. 22, 1993.*

* cited by examiner

BOOSTED IN-LINE VARIABLE-DISPLACEMENT ENGINE

CROSS REFERENCE TO RELATED APPLICATIONS

This patent application claims priority to German Patent Application DE 102012213936.2, filed Aug. 7, 2012, the entire contents of which are hereby incorporated by reference for all purposes.

TECHNICAL FIELD

This patent application relates to the field of motor-vehicle engineering, and more particularly, to a boosted in-line variable-displacement engine.

BACKGROUND AND SUMMARY

A boosted engine provides more output power than a naturally aspirated engine of equivalent displacement. In motor vehicles, therefore, boosting can provide a fuel-economy benefit due to the increased power-to-mass ratio of the engine, especially when an exhaust-driven turbocharger provides the boost.

In addition, a variable-displacement engine (VDE) may provide a fuel-economy benefit relative to a fixed-displacement engine of equivalent output power. In this case, the benefit derives from leaving some of the cylinders unfueled and operating the remaining cylinders at higher load, where fuel-economy is improved. In gasoline engines, variable displacement provides additional fuel economy benefits owing to reduced throttling losses and greater tolerance to exhaust recirculation (EGR).

In principle, a variable-displacement engine can be turbocharged to combine the fuel-economy benefits of both approaches. However, the combined benefit may be difficult to achieve across a wide range of operating conditions. In engines that use a single turbocharger, for example, that turbocharger must be configured for the maximum engine load and exhaust flow rate. At reduced exhaust flow, such a turbocharger may provide inadequate boost pressure. This issue has been addressed, in part, by exchange of the single turbocharger for two smaller turbochargers arranged in parallel. In one particular approach, an exhaust valve is arranged upstream of one of the turbines. Closure of the exhaust valve blocks exhaust flow through that turbine during low-load conditions, causing the other turbine to receive all of the exhaust flow. When the load increases to an appropriate level, the exhaust valve is opened, allowing both turbines to share the exhaust flow. In this manner, both turbines can operate efficiently. However, the inventors herein have recognized a disadvantage in the above approach, in that the exhaust valve must be configured for very high-temperature operation. This increases the cost and complexity of the engine system, and may also require additional diagnostics to check for exhaust valve degradation.

To address this issue and provide still other advantages, one embodiment provides an engine comprising a first turbine fluidically coupled to a first group of adjacent cylinders, and a second turbine fluidically coupled to a second group of adjacent cylinders. In this engine, the cylinders of the first and second groups are arranged along a line. The engine also includes a variable valve-lift system configured to admit at least air to the first group of cylinders during reduced engine-load conditions, but to stop admitting air to the second group of cylinders during the reduced engine-load conditions. In this manner, a motor-vehicle engine can enjoy the combined fuel-economy benefits of turbocharging and variable displacement, but without the disadvantages of a high-temperature exhaust valve. Further benefits will be evident from reading the balance of this disclosure and studying the attached drawing figures.

The statements above are provided to introduce a selected part of this disclosure in simplified form, not to identify key or essential features. The claimed subject matter, defined by the claims, is limited neither to the content above nor to implementations that address the problems or disadvantages referenced herein.

DETAILED DESCRIPTION

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

Figure 1:
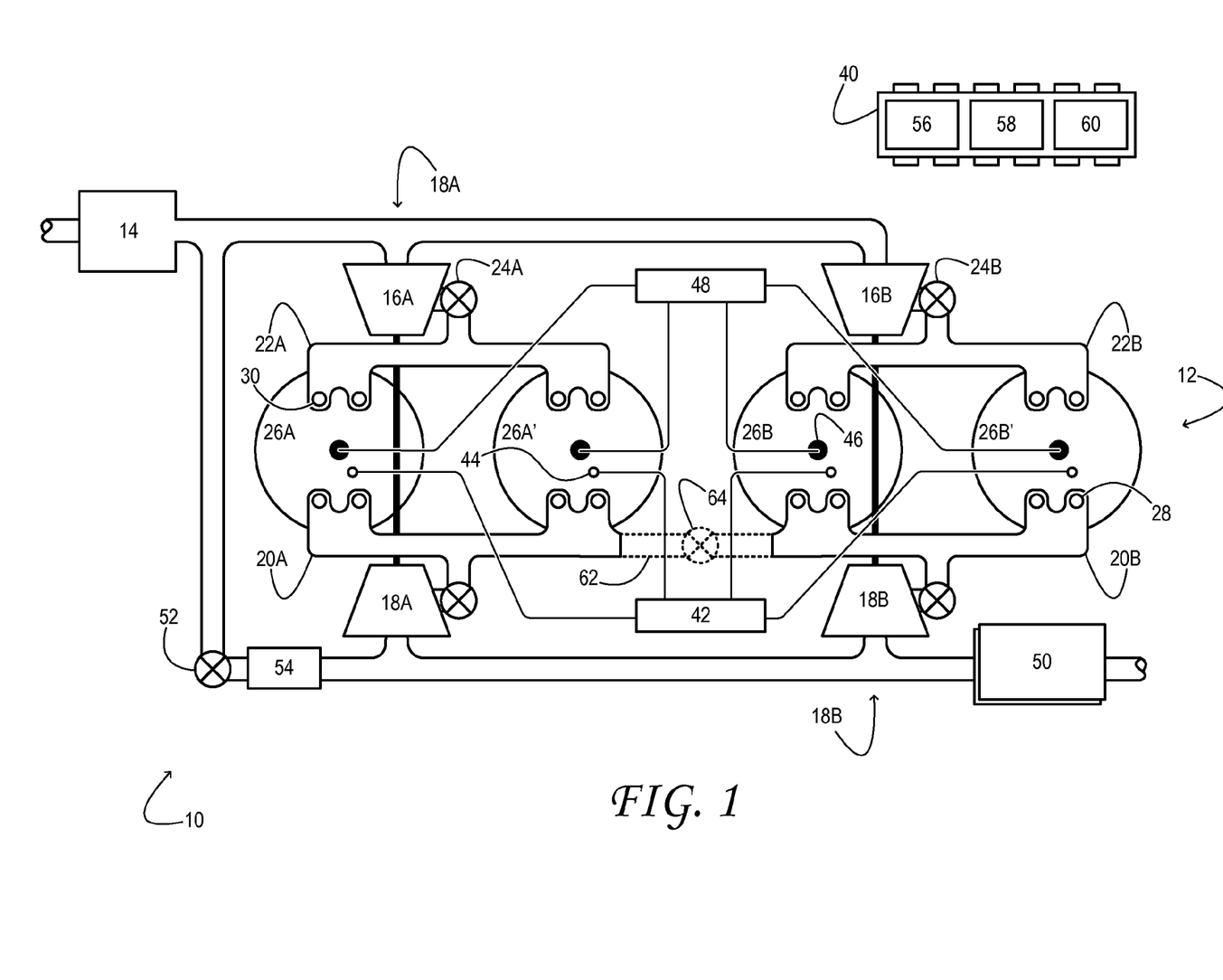
FIG. 1 is a plan view of aspects of an example engine system in accordance with an embodiment of this disclosure.

FIG. 1 shows aspects of an example engine system 10 of a motor vehicle. The engine system includes an engine 12, which inducts air, consumes fuel, and releases heat, exhaust, and mechanical energy. The engine may be a gasoline or diesel engine of a motor vehicle, for example. In these and other embodiments, the engine may be coupled in a hybrid-electric powertrain, which also includes an electric motor.

In engine system 10, fresh air is inducted into air cleaner 14 and flows to compressors 16A and 16B. Each compressor 16 is mechanically coupled to a corresponding turbine 18 in a turbocharger, the turbine driven by expanding engine exhaust from an exhaust conduit 20. In the illustrated embodiment, each compressor is coupled fluidically to a corresponding intake conduit 22 via a throttle valve 24. Pressurized air from the compressors flows through the throttle valves en route to the intake conduits. In some embodiments, a charge-air cooler may be arranged between each compressor and intake conduit. In addition, a compressor recirculation valve (CRV, not shown in the drawings) may be coupled between the inlet and the outlet of each compressor. The compressor recirculation valve may be a normally closed valve configured to open to relieve excess boost pressure under selected operating conditions. In engine system 10, each exhaust conduit 20 and intake conduit 22 are coupled to a series of cylinders 26 through a series of exhaust valves 28 and intake valves 30, respectively. In the illustrated in-line configuration, all of the cylinders of engine 12 are arranged along a line.

In one embodiment, the exhaust and/or intake valves of each cylinder may be electronically actuated. In another embodiment, the exhaust and/or intake valves may be cam actuated. Whether electronically actuated or cam actuated, the timing of exhaust and intake valve opening and closure may be adjusted as needed for desired combustion and emissions-control performance, or to enact variable-displacement functionality. To that end, each intake and exhaust valve is operatively coupled to a variable valve-lift system, as shown in FIG. 2.

Figure 2:
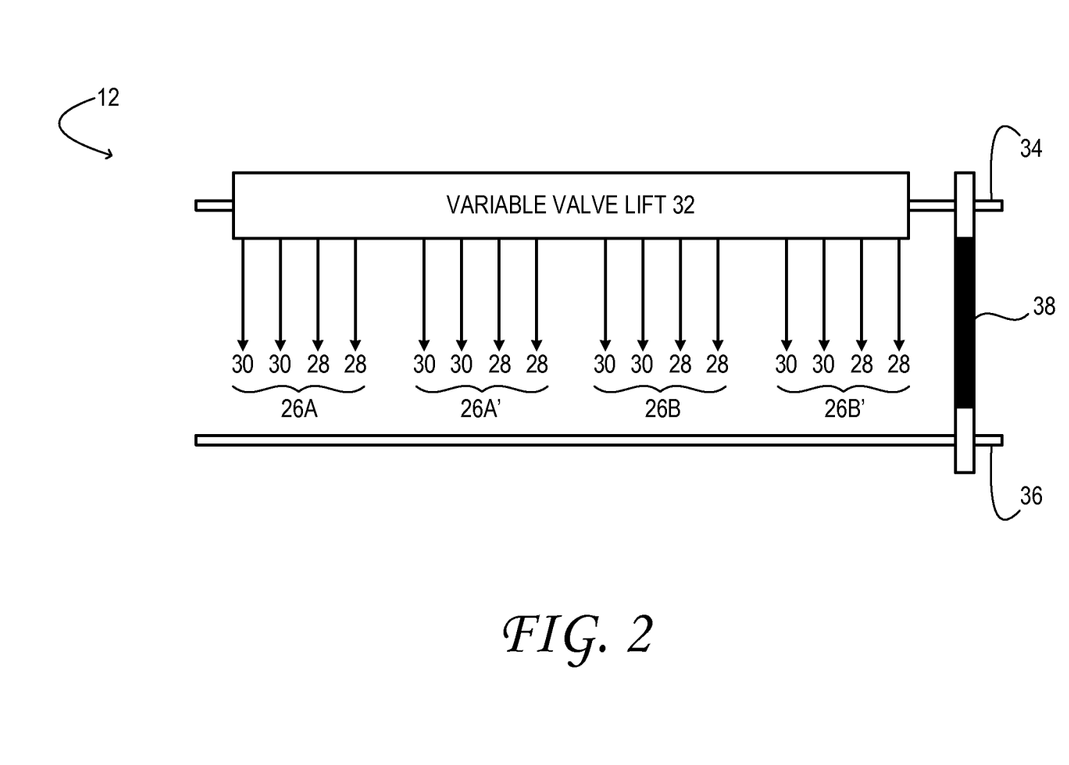
FIG. 2 shows aspects of a variable valve-lift system of an engine system in accordance with an embodiment of this disclosure.

FIG. 2 shows aspects of an example variable valve-lift system 32 integrated into engine 12. In the embodiment shown in the drawing, the variable valve-lift system is driven by camshaft 34, which is rotationally coupled to crankshaft 36 by way of a mechanical linkage 38. Electronic control system 40 may transmit to the variable valve-lift system a signal that determines the amount of valve lift to be applied to the intake valves 30 and exhaust valves 28 of each cylinder. In some embodiments, the amount of valve lift may be varied independently for each cylinder.

Returning now to FIG. 1, cylinders 26 may be supplied any of a variety of fuels, depending on the embodiment: diesel, biodiesel, compressed natural gas, gasoline, alcohols, or mixtures thereof. In the illustrated embodiment, fuel from fuel system 42 is supplied to the cylinders via direct injection through fuel injectors 44. In the various embodiments considered herein, the fuel may be supplied via direct injection, port injection, throttle-body injection, or any combination thereof. In the illustrated embodiment, combustion is initiated via spark ignition at spark plugs 46. The spark plugs are driven by timed high-voltage pulses from electronic ignition system 48. In other embodiments, combustion may be initiated via compression ignition in any variant.

Engine system 10 may include a high-pressure (HP) exhaust recirculation (EGR) system (not shown in the drawings), of one or more conduits, valves and/or coolers. Accordingly, some high-pressure exhaust from exhaust conduits 20 may be recirculated to the corresponding intake conduits 22. In the intake conduits, the high pressure exhaust dilutes the intake-air charge for lower combustion temperatures, decreased emissions, and other benefits. The remaining exhaust flows to turbines 18. When reduced turbine torque is desired, some or all of the exhaust may be directed instead through wastegate valves of the turbocharger (not shown in the drawings), which by-pass the turbines. The combined flow from the turbines and wastegate valves then flows through the various emissions-control devices 50 of the engine system. Such devices may include a three-way catalyst (TWC) device, a lean NO trap (LNT), a diesel oxidation catalyst (DOC), a diesel particulate filter (DPF), and/or a selective catalytic reduction (SCR) catalyst, for example.

Continuing in FIG. 1, all or part of the treated exhaust may be released into the ambient via a silencer. Depending on operating conditions, however, some exhaust may be diverted through a low-pressure (LP) EGR system, before or after emissions-control treatment. The exhaust may be diverted by opening LP EGR valve 52 coupled in series with the LP EGR cooler 54. From LP EGR valve 52, the cooled exhaust gas flows to compressors 16. The LP EGR system may also include additional valves, such as an exhaust-backpressure valve or air-intake system (AIS) throttle valve, which increase EGR flow potential under selected operating conditions.

FIG. 1 also shows electronic control system 40, which is configured to control and coordinate various engine-system functions. To that end, the electronic control system includes machine-readable storage media (i.e., memory) and one or more processors. Instructions coded into the machine-readable storage media enable decision making responsive to sensor input and directed to intelligent control of engine-system componentry. Such decision-making may be enacted according to various strategies: event-driven, interrupt-driven, multi-tasking, multi-threading, and the like. In this manner, the electronic control system may be configured to enact any or all aspects of the methods disclosed herein, wherein the various method steps—e.g., operations, functions, and acts—may be embodied as code programmed into the machine-readable storage media.

Electronic control system 40 includes sensor interface 56, engine-control interface 58, and on-board diagnostic (OBD) unit 60. To assess operating conditions of engine system 10 and of the vehicle in which the engine system is installed, sensor interface 56 receives input from various sensors arranged in the vehicle—flow sensors, temperature sensors, pedal-position sensors, pressure sensors, etc. Engine-control interface 58 is configured to actuate electronically controllable valves, actuators, and other componentry of the vehicle—throttle valves, CRVs, wastegate and EGR valves, for example. The engine-control interface is operatively coupled to each electronically controlled valve and actuator and is configured to command its opening, closure, and/or adjustment as needed to enact the control functions described herein. OBD unit 60 unit is a portion of the electronic control system configured to diagnose degradation of various components of engine system 10. Such components may include valves, sensors, fuel injectors, and emissions-control components, as examples.

An engine system as described above may be configured to allow the combined fuel-economy benefits of turbocharging and variable displacement to be realized over a broad range of operating conditions. Thus, instead of routing the combined exhaust flow from all cylinders 26 into both turbines 18, different turbines are fluidically coupled to different groups of cylinders. In the embodiment of FIG. 1, for example, first turbine 18A is fluidically coupled to a first group of adjacent cylinders 26A and 26A', and second turbine 18B is fluidically coupled to a second group of adjacent cylinders 26B and 26B'. Each group of cylinders may include exactly two cylinders, as shown, or there may be more or fewer cylinders per group.

For decreased exhaust back pressure, each cylinder of the first and second groups includes two exhaust ports with associated exhaust valves 28. In other embodiments, each cylinder may have only one exhaust port, or more than two. In these and other embodiments, a first exhaust conduit 20A opens to each exhaust port of the first group of cylinders; it includes one or more merge portions that merge into the first turbine. Likewise, second exhaust conduit 20B opens to each exhaust port of the second group of cylinders; it includes one or more merge portions that merge into the second turbine. In some embodiments, at least one merge portion of the first group of cylinders and at least one merge portion of the second group of cylinders is arranged within the cylinder head of the engine.

In some embodiments, the overall turbocharger arrangement may be largely symmetric. In FIG. 1, accordingly, first compressor 16A is mechanically coupled to first turbine 18A, and second compressor 16B is mechanically coupled to second turbine 18B. The first compressor is fluidically coupled to the first group of cylinders 26A and 26A' via a first intake conduit 22A, which may include one or more merge portions that merge into the first compressor. Likewise, the second compressor is fluidically coupled to the second group of cylinders 26B and 26B' via a second intake conduit 22B, which may include one or more merge portions that merge into second compressor. Thus, in the embodiment shown in FIG. 1, the air intake is split downstream of the compressor but shared upstream of the compressor.

In this approach, the size of each turbine 18 is optimized based on exhaust-flow rate from an individual group of cylinders from partial-load to full-load conditions. Deactivation of one of the cylinder groups during low-load conditions ensures that neither turbine becomes severely under-loaded, which preserves compressor power for the group that remains active. The disclosed cylinder grouping also results in shorter exhaust conduits overall, and reduction of the mass of the exhaust-system upstream of the turbines. Consequently, the thermal inertia of the exhaust system is reduced, enabling the turbines to better utilize the exhaust enthalpy.

A further advantage of the disclosed cylinder grouping is that at relatively low loads or engine speeds, the pre-outlet 'shock' in the exhaust flow can be utilized advantageously for impulse boosting. This is due to the cylinders being grouped in such a way that the pre-outlet shocks of the individual cylinders are maintained or reinforced, rather than being cancelled out. As described in further detail below, this aspect is secured, for example, when ignition in the various cylinders of a group is separated by intervals of 360 crank-angle degrees. High turbine pressure ratios (and therefore charge-pressure ratios) can be maintained, therefore, even at low turbine rotational speeds.

In the cylinder grouping disclosed herein, each group includes one outer cylinder and the adjacent inner cylinder. This configuration offers an additional advantage in that the two exhaust conduits are arranged next to one another along the longitudinal axis of the cylinder head. Therefore, the two exhaust conduits can emerge from the cylinder head at an equal distance from the assembly-end side of the cylinder head—i.e., at the same height. A cylinder head of a relatively small structural height can be used, therefore, which packs more easily into the engine bay. The connection and arrangement of the exhaust turbochargers is likewise simplified, as the turbines can be packed closely together. By contrast, in the case of conventional cylinder grouping, where the inner cylinders form one cylinder group and the outer cylinders form another cylinder group, the two exhaust conduits must be arranged at least partially one above one another. Here, the cylinder head has a relatively large structural height, as the two exhaust conduits emerge from the cylinder head at different distances from the assembly-end side of the cylinder head.

In the illustrated embodiment, the exhaust conduits of the two cylinder groups merge to form a common exhaust conduit downstream of the turbines. The merging of the exhaust conduits reduces the overall length of the exhaust conduits and offers additional advantages with regard to exhaust aftertreatment, as all of the exhaust gas can be treated in a common, non-redundant exhaust aftertreatment process. In one embodiment, such merging can occur within the cylinder head.

Integration of the exhaust manifold into the cylinder head has numerous advantages. The integration leads to a more compact engine configuration and reduces weight and assembly costs. Short exhaust conduits, in general, have an advantageous effect on the arrangement and the operation of an exhaust aftertreatment system. Notably, the path of the hot exhaust flow to the exhaust aftertreatment systems ought to be as short as possible, so that the exhaust is given little time to cool. Accordingly, the exhaust aftertreatment stages reach their light-off temperatures as quickly as possible. For this reason, it is expedient to minimize the thermal inertia of the part of the exhaust conduits between the outlet opening at the cylinder and the exhaust aftertreatment system—e.g., by integrating the exhaust conduits into the cylinder head. This configuration also enables the exhaust conduits to be cooled via the cooling jackets associated with the cylinder head.

Continuing in FIG. 1, a connecting conduit 62 links first exhaust conduit 20A to second exhaust conduit 20B at positions fluidically upstream of first turbine 18A and of second turbine 18B, respectively. Arranged in the connecting conduit is a connecting valve 64. The connecting valve is closable to fluidically isolate the first exhaust conduit from the second exhaust conduit under selected operating conditions. To that end, the connecting valve may be an electronically controlled valve operatively coupled to electronic control system 40.

By opening and closure of connecting valve 64, the exhaust volume upstream of a turbine can be varied depending on operating conditions. At relatively low exhaust flow rates, for example, the connecting valve may be closed, such that exhaust conduits 20A and 20B remain separate from each other. This action preserves the pre-outlet shock from each cylinder. At higher exhaust flow rates, the connecting valve may be opened in order to smooth the pressure pulsations of the various cylinders—e.g., to realize so-called 'ram turbocharging.'

To accomplish variable-displacement functionality, variable valve-lift system 32 may be configured to admit at least air to the first group of cylinders during reduced engine-load conditions, but to stop admitting air to the second group of cylinders during the reduced engine-load conditions. The term 'at least air' encompasses an air-fuel mixture, an air-exhaust mixture, or air alone. In other words, the variable valve-lift system may hold the intake valves of the second group of cylinders closed during the reduced engine-load conditions. In addition, the variable valve-lift system may also hold the exhaust valves of the second group of cylinders closed during the reduced engine-load conditions. In this manner, the deactivated cylinders function as springs. Likewise, fuel-injection system 42 may be configured to fuel the first group of cylinders during reduced engine-load conditions, but to stop fueling the second group of cylinders during the reduced engine-load conditions. Moreover, electronic-ignition system 48 may be configured to deliver a spark in the first group of cylinders during the reduced engine-load conditions, but to stop delivering the spark in the second group of cylinders during the reduced engine-load conditions.

Figure 3:
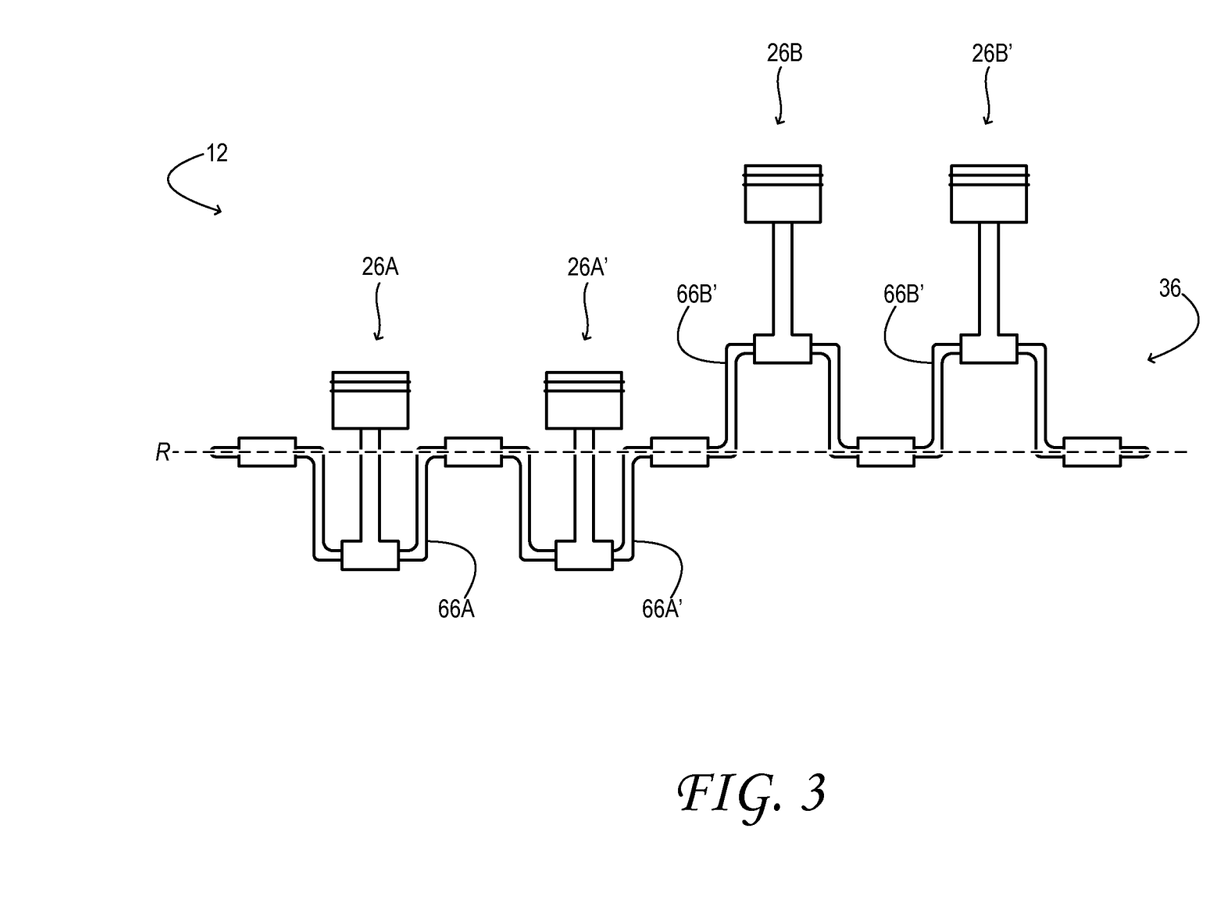
FIG. 3 is an elevational view of aspects of an example engine crankshaft in accordance with an embodiment of this disclosure.

Further advantage is derived from the detailed configuration of the crankshaft of engine 12, which is shown in FIGS. 2 and 3. With reference to FIG. 3, crankshaft 36 has a throw 66 associated with each cylinder 26 of engine 12. Each throw is coupled rotationally—i.e., by way of a bearing—to the piston within that cylinder. Here, the throws associated with all cylinders of the first group (26A, 26A') eclipse each other when viewed from a point along the rotation axis R. In addition, the throws associated with all cylinders of the second group (26B, 26B') eclipse each other when viewed from a point along the rotation axis. Thus, the cylinders of each group are mechanically synchronous.

Figure 4:
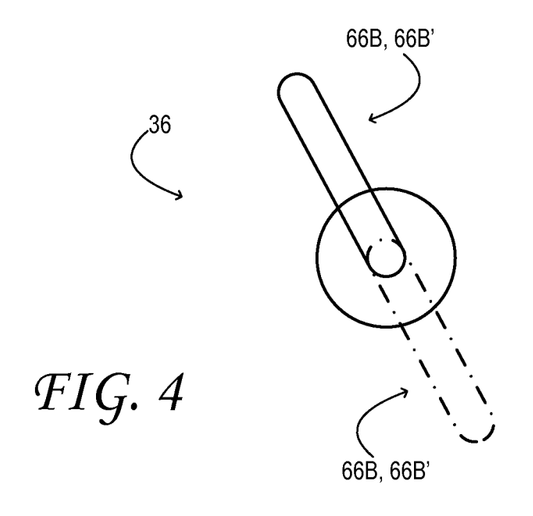
FIG. 4 shows the crankshaft of FIG. 3 as viewed from a point on the rotational axis of the crankshaft.

FIG. 4 shows the same crankshaft as viewed down the rotational axis. Here, the throws associated with the cylinders of the first group diametrically oppose the throws associated with the cylinders of the second group when viewed from a point along the rotation axis. In other words, the throws of the two groups are set 180 crank-angle degrees apart from each other.

To avoid cancellation of exhaust-pressure pulsations within either exhaust conduit, combustion is initiated alternately in the cylinders of the first and second groups—e.g., in the sequence 1, 3, 2, 4 or in the sequence 1, 4, 2, 3, with the cylinders numbered sequentially in the line in which they are arranged. Accordingly, the cylinders may be sparked at intervals of 180 crank-angle degrees, such that, proceeding from the first cylinder, the ignition times are: 0, 180, 360, and 540 crank-angle degrees. In this manner, the cylinders of a given cylinder group have a thermodynamic offset of 360 crank-angle degrees. Furthermore, the exhaust valves may have an opening duration of between 220 and 260 crank-angle degrees. With the selected ignition sequence, the cylinders of each group exert little influence over each other during charge exchange, regardless of how short the distance is to the merging of the exhaust conduits downstream of the exhaust ports. The inventive ignition sequences disclosed herein are consistent with the crankshaft configurations as shown. In particular, the crankshafts enable the cylinders of each group to operate synchronously—i.e., to pass through top dead center at the same time. For this purpose, the associated crankshaft throws for cylinders of the same group have no offset in the circumferential direction about the rotational axis of the crankshaft. A thermodynamic offset of 360 crank angle degrees is then realized via the ignition sequence.

The configurations described above enable various methods for operating a boosted, in-line, variable-displacement engine of a motor vehicle. Accordingly, some such methods are now described, by way of example, with continued reference to the above configurations. It will be understood, however, that the methods here described, and others within the scope of this disclosure, may be enabled by different configurations as well. The methods may be entered upon any time the engine system is operating, and may be executed repeatedly. Naturally, each execution of a method may change the entry conditions for a subsequent execution and thereby invoke a complex decision-making logic. Such logic is fully contemplated in this disclosure. Further, some of the process steps described and/or illustrated herein may, in some embodiments, be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Figure 5:
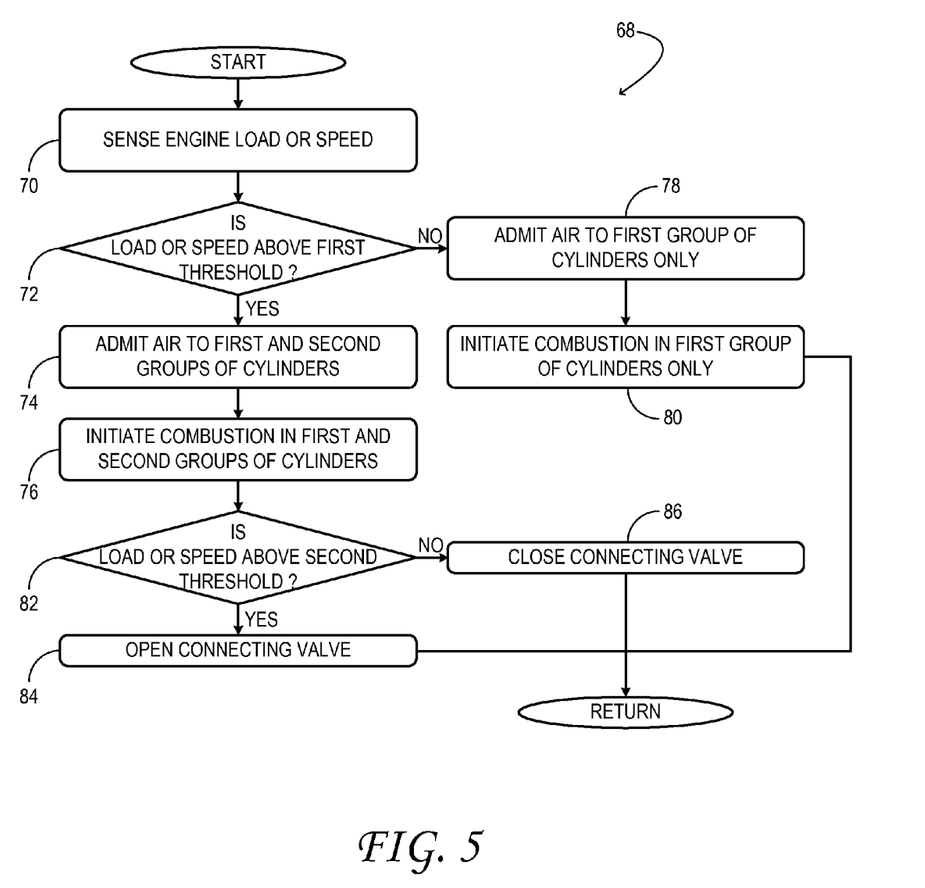
FIG. 5 illustrates an example method for operating a boosted, in-line, variable-displacement engine of a motor vehicle, in accordance with an embodiment of this disclosure.

FIG. 5 illustrates an example method 68 for operating a boosted, in-line, variable-displacement engine of a motor vehicle. At 70 of method 68, the load or speed of the engine is sensed. The load or speed may be sensed by one or more sensors operatively coupled to electronic control system 40. In some embodiments, the load or speed may be sensed indirectly, via a suitable surrogate such as manifold air flow, manifold air pressure, throttle inlet pressure, etc. In other embodiments, this action may include sensing an exhaust gas flow rate in the engine. Here, the engine load or speed may be determined based on the exhaust gas flow rate.

The skilled reader will appreciate that in a boosted engine, the charge pressure on the intake side may vary with engine load or engine speed, and has an influence on the exhaust flow rate. It may therefore be advantageous for the partial deactivation to be based on the exhaust flow rate instead of load. Some cylinders may be deactivated, therefore, if the exhaust flow rate falls below a pre-definable exhaust flow rate (vide infra).

At 72 it is determined whether the engine load or speed is above a predefined first threshold. If the load or speed is above the first threshold, then the method advances to 74, where at least air is admitted to first and second groups of adjacent cylinders. At 76 combustion is initiated in the first and second groups of cylinders. In one embodiment, combustion in the cylinders may be initiated at intervals of 180 crank-angle degrees when the engine load or speed is above the first predefined threshold. Here, the first group of cylinders may include first and second cylinders of the engine, and the second group of cylinders may include third and fourth cylinders of the engine, the first cylinder being adjacent the second cylinder, second cylinder being adjacent the third cylinder, and the third cylinder being adjacent the fourth cylinder. Accordingly, combustion may be initiated in the sequence: first cylinder, third cylinder, second cylinder, fourth cylinder. In another embodiment, combustion may be initiated in the sequence: first cylinder, fourth cylinder, second cylinder, third cylinder, for example. According to such firing sequences, combustion in successive cylinders of the first group may be initiated 360 crank-angle degrees apart from each other, and, combustion in successive cylinders of the second group may be initiated 360 crank-angle degrees apart from each other.

Continuing in FIG. 5, if the engine load or speed is below the first threshold, then the method advances to 78, where the first group of cylinders continues to receive air, but the second group of cylinders does not receive air, or ceases to receive air. Then, at 80, combustion only in the first group of cylinders is initiated.

Returning now to 82 of method 68, it is there determined whether the load or speed of the engine is above a second predefined threshold. The second predefined threshold may correspond to a higher load than the first predefined threshold, or to a higher speed—20 percent higher or 50 percent higher or 100 percent higher, for example. If the load or speed is above the second predefined threshold, then the method advances to 84, where a valve arranged in a connecting conduit that links the first and second exhaust conduits is opened. This action may be taken to smooth pressure pulsations delivered to the first and second turbines. However, if the engine load or speed is not above second threshold, then the method advances to 86, where the connecting valve is closed or remains closed, which maintains the pressure pulsations.

No aspect of the foregoing method should be interpreted in a limiting sense, for numerous variations and extensions are contemplated as well. For instance, to avoid uneven wear of the first and second groups of cylinders, these groups may be periodically exchanged, such that the second group continues to receive air when the engine load or speed is below the first predefined threshold, but the first group ceases to receive air, etc. Furthermore, in some direct-injection embodiments, an appropriate method may include fueling only those cylinders that receive air, while keeping the closed-off cylinders unfueled.

It will be understood that the articles, systems, and methods described hereinabove are embodiments of this disclosure—non-limiting examples for which numerous variations and extensions are contemplated as well. This disclosure also includes all novel and non-obvious combinations and sub-combinations of the above articles, systems, and methods, and any and all equivalents thereof.

The invention claimed is:

1. An engine comprising:
a first turbine fluidically coupled to a first group of adjacent cylinders via a first exhaust conduit;
a second turbine fluidically coupled to a second group of adjacent cylinders arranged along a line with the first group of cylinders, the second turbine fluidically coupled to the second group via a second exhaust conduit, the first exhaust conduit and the second exhaust conduit fluidly coupled via a connecting valve and in thermal communication with coolant jackets of a cylinder head;

a variable valve-lift system configured to admit at least air to the first group of cylinders during reduced engine-load conditions, but to stop admitting air to the second group of cylinders during the reduced engine-load conditions;

a first compressor fluidically coupled to the first group of cylinders via a first intake conduit and mechanically coupled to the first turbine, the first intake conduit including a first throttle valve and one or more merge portions that merge into the first compressor, the first intake conduit only coupled to the first group of cylinders downstream of the first throttle; and a second compressor fluidically coupled to the second group of cylinders via a second intake conduit and mechanically coupled to the second turbine, the second intake conduit including a second throttle valve and one or more merge portions that merge into the second compressor, the second intake conduit only coupled to the second group of cylinders downstream of the second throttle; and a crankshaft having a throw associated with each cylinder and coupled rotationally to a piston within that cylinder, wherein the crankshaft presents a rotation axis, wherein the throws associated with all cylinders of the first group eclipse each other when viewed from a point along the rotation axis; and wherein the throws associated with all cylinders of the second group eclipse each other when viewed from a point along the rotation axis.

2. The engine of claim 1 wherein each cylinder of the first and second groups of cylinders includes one or more exhaust ports, the engine further comprising:
the first exhaust conduit opening to each exhaust port of the first group of cylinders, and including one or more merge portions that merge into the first turbine; and
the second exhaust conduit opening to each exhaust port of the second group of cylinders, and including one or more merge portions that merge into the second turbine.

3. The engine of claim 2 further comprising a cylinder head, wherein at least one merge portion of the first group of cylinders and at least one merge portion of the second group of cylinders is arranged within the cylinder head.

4. The engine of claim 2 further comprising:
a connecting conduit linking the first exhaust conduit to the second exhaust conduit at positions fluidically upstream of the first turbine and of the second turbine, respectively; and
arranged in the connecting conduit, a connecting valve closable to fluidically isolate the first exhaust conduit from the second exhaust conduit.

5. The engine of claim 2 wherein the one or more exhaust ports include exactly two exhaust ports.

6. The engine of claim 1 further comprising a spark plug coupled in each cylinder and an electronic-ignition system operatively coupled to the spark plugs, wherein the electronic-ignition system is configured to deliver a spark in the first group of cylinders during the reduced engine-load conditions, but to stop delivering the spark in the second group of cylinders during the reduced engine-load conditions.

7. The engine of claim 1 wherein the first and second groups of cylinders each include exactly two cylinders.

8. The engine of claim 1 wherein the throws associated with the cylinders of the first group diametrically oppose the throws associated with the cylinders of the second group when viewed from a point along the rotation axis.

9. A method for operating an engine, comprising:
when engine load or speed is above a predefined threshold, admitting at least air to a first group of adjacent cylinders fluidically coupled to a first turbine via a first exhaust conduit, and admitting at least air to a second group of adjacent cylinders fluidically coupled to a second turbine via a second exhaust conduit, the cylinders of the first and second groups arranged along a line, the first exhaust conduit and second exhaust conduits cooled with cooling jackets associated with a cylinder head;
when the engine load or speed is below the predefined threshold, continuing to admit at least air to the first group of cylinders but ceasing to admit air to the second group of cylinders; and
admitting at least air via a first compressor fluidically coupled to only the first group of cylinders via a first intake conduit and mechanically coupled to the first turbine, the first intake conduit including a first throttle valve and one or more merge portions that merge into the first compressor, and a second compressor fluidically coupled to only the second group of cylinders via a second intake conduit and mechanically coupled to the second turbine, the second intake conduit including a second throttle valve and one or more merge portions that merge into the second compressor; and a crankshaft having a throw associated with each cylinder and coupled rotationally to a piston within that cylinder, wherein the crankshaft presents a rotation axis, wherein the throws associated with all cylinders of the first group eclipse each other when viewed from a point along the rotation axis; and wherein the throws associated with all cylinders of the second group eclipse each other when viewed from a point along the rotation axis.

10. The method of claim 9 further comprising initiating combustion in the cylinders at intervals of 180 crank-angle degrees when the engine load or speed is above the predefined threshold.

11. The method of claim 10 wherein the first group of cylinders includes first and second cylinders of the engine, wherein the second group of cylinders includes third and fourth cylinders of the engine, wherein the first cylinder is adjacent the second cylinder, the second cylinder is adjacent the third cylinder, and the third cylinder is adjacent the fourth cylinder, and wherein the combustion is initiated in the sequence: first cylinder, third cylinder, second cylinder, fourth cylinder.

12. The method of claim 10 wherein the first group of cylinders includes first and second cylinders of the engine, wherein the second group of cylinders includes third and fourth cylinders of the engine, wherein the first cylinder is adjacent the second cylinder, the second cylinder is adjacent the third cylinder, and the third cylinder is adjacent the fourth cylinder, and wherein the combustion is initiated in the sequence: first cylinder, fourth cylinder, second cylinder, third cylinder.

13. The method of claim 10 further comprising:
initiating combustion in successive cylinders of the first group 360 crank-angle degrees apart from each other; and
when the engine load or speed is above the predefined threshold, initiating combustion in successive cylinders of the second group 360 crank-angle degrees apart from each other.

14. The method of claim 9 further comprising sensing an exhaust gas flow rate in the engine, wherein the engine load or speed is determined based on the exhaust gas flow rate.

15. The method of claim 9 wherein the predefined threshold is a first predefined threshold, the method further comprising:
   when the engine load or speed is above a second predefined threshold, opening a valve arranged in a connecting conduit that links the first and second exhaust conduits, to smooth pressure pulsations delivered to the first and second turbines.

16. The method of claim 9 further comprising, to avoid uneven wear of the first and second groups of cylinders, periodically exchanging the first and second groups of cylinders such that the second group continues to receive air when the engine load or speed is below the predefined threshold while the first group ceases to receive air.

17. An engine comprising:
   a first turbine fluidically coupled to a first group of adjacent cylinders via a first exhaust conduit;
   a second turbine fluidically coupled to a second group of adjacent cylinders via a second exhaust conduit, the cylinders of the first and second groups arranged along a line and each including one or more exhaust ports;
   the first exhaust conduit opening to each exhaust port of the first group of cylinders, and including within a cylinder head one or more merge portions that merge into the first turbine;
   the second exhaust conduit opening to each exhaust port of the second group of cylinders, and including within the cylinder head one or more merge portions that merge into the second turbine;
   the first exhaust conduit and the second exhaust conduit cooled with cooling jackets associated with the cylinder head;
   a connecting conduit linking the first exhaust conduit to the second exhaust conduit at positions fluidically upstream of the first turbine and of the second turbine, respectively;
   arranged in the connecting conduit, a connecting valve closable to fluidically isolate the first exhaust conduit from the second exhaust conduit;
   a variable valve-lift system configured to admit at least air to the first group of cylinders during reduced engine-load conditions, but to stop admitting air to the second group of cylinders during the reduced engine-load conditions;
   a first compressor fluidically coupled to only the first group of cylinders via a first intake conduit and mechanically coupled to the first turbine, the first intake conduit including a first throttle valve and one or more merge portions that merge into the first compressor; and
   a second compressor fluidically coupled to only the second group of cylinders via a second intake conduit and mechanically coupled to the second turbine, the second intake conduit including a second throttle valve and one or more merge portions that merge into the second compressor; and a crankshaft having a throw associated with each cylinder and coupled rotationally to a piston within that cylinder, wherein the crankshaft presents a rotation axis, wherein the throws associated with all cylinders of the first group eclipse each other when viewed from a point along the rotation axis; and wherein the throws associated with all cylinders of the second group eclipse each other when viewed from a point along the rotation axis.

* * * * *